(12) United States Patent
Ono et al.

(10) Patent No.: US 9,690,427 B2
(45) Date of Patent: Jun. 27, 2017

(54) USER INTERFACE DEVICE, AND PROJECTOR DEVICE

(71) Applicant: Panasonic Intellectual Property Management Co., Ltd., Osaka (JP)

(72) Inventors: Keigo Ono, Osaka (JP); Kunihiro Mima, Kyoto (JP); Satoshi Kamiya, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/062,850

(22) Filed: Mar. 7, 2016

(65) Prior Publication Data

US 2016/0188028 A1 Jun. 30, 2016

Related U.S. Application Data

(63) Continuation of application No. PCT/JP2015/003160, filed on Jun. 24, 2015.

(30) Foreign Application Priority Data

Sep. 3, 2014 (JP) .................................. 2014-179338
Mar. 10, 2015 (JP) .................................. 2015-047530

(51) Int. Cl.
*G06F 3/041* (2006.01)
*G06F 3/042* (2006.01)
(Continued)

(52) U.S. Cl.
CPC .............. *G06F 3/042* (2013.01); *G06F 3/017* (2013.01); *G06F 3/0304* (2013.01);
(Continued)

(58) Field of Classification Search
USPC ................................................ 345/173–174
See application file for complete search history.

(56) References Cited

U.S. PATENT DOCUMENTS

5,335,547 A 8/1994 Nakajima et al.
2011/0169746 A1 7/2011 Kitajima
(Continued)

FOREIGN PATENT DOCUMENTS

JP 62-49405 3/1987
JP 2009-64109 3/2009
(Continued)

OTHER PUBLICATIONS

International Search Report issued Aug. 18, 2015 in corresponding International Application No. PCT/JP2015/003160.

*Primary Examiner* — Roy Rabindranath
(74) *Attorney, Agent, or Firm* — Wenderoth, Lind & Ponack, L.L.P.

(57) ABSTRACT

A user interface device for detecting an operation, by a finger of a user, on an operation member presented on a projection surface includes a distance detector for detecting a distance to the projection surface, and a distance to the finger, and a controller for detecting the operation based on the distances detected by the distance detector. When presence of the finger between the projection surface and the distance detector is determined, the controller calculates a normal vector of the projection surface based on distances from the distance detector to positions of at least three points on a surface of the projection surface and a distance from the distance detector to the finger, and detects, based on the normal vector, presence or absence of an operation on the operation member.

6 Claims, 13 Drawing Sheets

(51) Int. Cl.
*G06F 3/01* (2006.01)
*G06F 3/03* (2006.01)
*G06F 3/0484* (2013.01)
*G06F 3/0488* (2013.01)

(52) U.S. Cl.
CPC .......... *G06F 3/0418* (2013.01); *G06F 3/0425* (2013.01); *G06F 3/0426* (2013.01); *G06F 3/04842* (2013.01); *G06F 3/04845* (2013.01); *G06F 3/04883* (2013.01); *G06F 2203/04806* (2013.01)

(56) References Cited

U.S. PATENT DOCUMENTS

| | | | |
|---|---|---|---|
| 2011/0221877 A1 | 9/2011 | Hori et al. | |
| 2011/0298704 A1* | 12/2011 | Krah | G01B 11/00 345/156 |
| 2012/0098865 A1 | 4/2012 | Takano et al. | |
| 2012/0317516 A1 | 12/2012 | Ohsumi | |
| 2013/0285985 A1* | 10/2013 | Pinter | G06F 3/0421 345/175 |
| 2014/0292723 A1* | 10/2014 | Suzuki | G06F 3/04883 345/175 |
| 2014/0375553 A1* | 12/2014 | Mrusek | G06F 3/017 345/156 |

FOREIGN PATENT DOCUMENTS

| | | |
|---|---|---|
| JP | 2011-182977 | 9/2011 |
| JP | 2012-104096 | 5/2012 |
| JP | 2012-256213 | 12/2012 |

\* cited by examiner

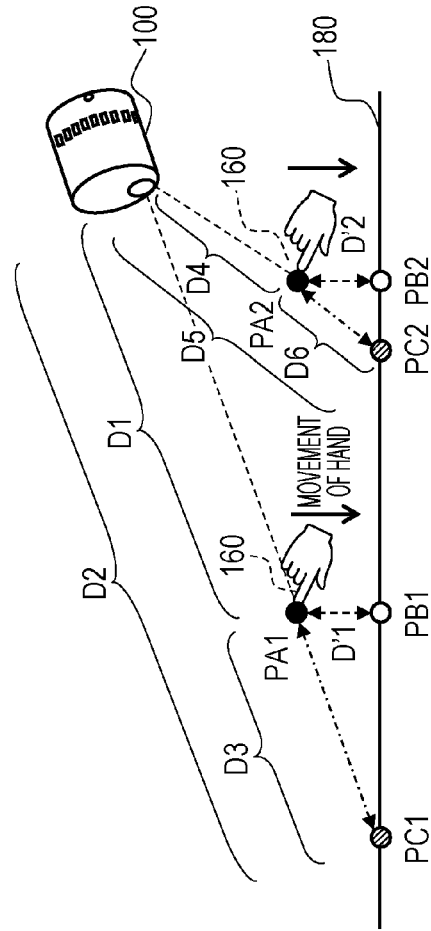
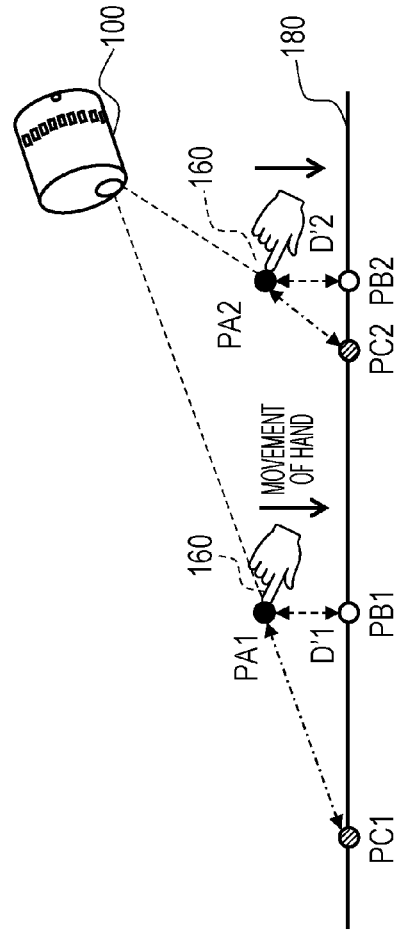
FIG. 6A
FIG. 6B

USER INTERFACE DEVICE, AND PROJECTOR DEVICE

BACKGROUND

1. Technical Field

The present disclosure relates to a user interface device for detecting an operation on an operation member, and a projector device.

2. Description of the Related Art

Unexamined Japanese Patent Publication No. 2012-104096 (hereinafter referred to as PTL 1) discloses a projector for projecting an image of an operation icon on a projection surface, and for allowing a user operation on the projected operation icon. This projector measures distance X in a normal direction from the surface where the projector is placed to the position of a fingertip of a user based on captured image data, and determines whether distance X in the normal direction is equal to or less than a predetermined distance. In the case where distance X in the normal direction is equal to or less than a predetermined distance, the projector changes a size of an operation icon immediately below the fingertip to a larger size and projects the icon. Accordingly, even when there is a finger, the influence of the finger can be eliminated, and an operation icon may be made easily visible to the user and a desirable operation is enabled.

PTL 1 discloses a configuration of a projector where it is assumed that a camera which is distance measurement means and a projection surface squarely face each other (an optical axis of the camera is orthogonal to the projection surface). If the camera and the projection surface do not squarely face each other but obliquely face each other, there is a problem that the distance is erroneously measured and a user operation is not appropriately detected, and thus, that appropriate behavior as a user interface device may not be realized.

SUMMARY

The present disclosure provides a user interface device capable of appropriately detecting an operation on a presented operation member, which is a target of a touch operation, even when an object presenting the operation member and a distance detector do not squarely face each other, and a projector device.

According to a first mode of the present disclosure, there is provided a user interface device for detecting an operation, by a second object, on an operation member presented on a first object. The user interface device includes a distance detector for detecting a distance to the first object, and a distance to the second object, and a controller for detecting the operation based on the distances detected by the distance detector. When presence of the second object between the first object and the distance detector is determined, the controller calculates a normal vector of the first object based on distances from the distance detector to positions of at least three points on a surface of the first object and a distance from the distance detector to the second object, and detects, based on the normal vector, presence or absence of an operation done by the second object on the operation member.

According to a second mode of the present disclosure, there is provided a projector device including a picture projection unit for projecting a picture of a predetermined operation member on a first object, and a user interface device for detecting an operation on the operation member by a second object. The user interface device includes a distance detector for detecting a distance to the first object, and a distance to the second object, and a controller for detecting the operation based on the distances detected by the distance detector. When presence of the second object between the first object and the distance detector is determined, the controller calculates a normal vector of the first object based on distances from the distance detector to positions of at least three points on a surface of the first object and a distance from the distance detector to the second object, and detects, based on the normal vector, presence or absence of an operation done by the second object on the operation member.

According to the present disclosure, even in a case where an object presenting an operation member as a target of a touch operation and a distance detector do not squarely face each other, the distance between the operation member and an object (for example, a finger of a user) that performs an operation on the operation member may be accurately detected. Accordingly, there may be provided a user interface device capable of appropriately detecting an operation on an operation member that is presented, and a projector device.

BRIEF DESCRIPTION OF DRAWINGS

FIG. 6A is a diagram for describing a problem that may occur in a case where the distance detector and a projection surface, which is a target of a touch operation, do not squarely face each other;

FIG. 6B is a diagram for describing a problem that may occur in a case where the distance detector and the projection surface, which is a target of a touch operation, do not squarely face each other;

DETAILED DESCRIPTION

Hereinafter, exemplary embodiments will be described in detail with reference to the drawings as appropriate. However, unnecessarily detailed description may be omitted. For example, detailed description of already well-known matters and repeated description of substantially the same structure may be omitted. All of such omissions are intended to facilitate understanding by those skilled in the art by preventing the following description from becoming unnecessarily redundant.

Moreover, the applicant provides the appended drawings and the following description for those skilled in the art to fully understand the present disclosure, and does not intend the subject described in the claims to be limited by the appended drawings and the following description.

First Exemplary Embodiment

Projector device 100 will be described as a specific exemplary embodiment of a device on which a user interface device according to the present disclosure is mounted.

Figure 1:
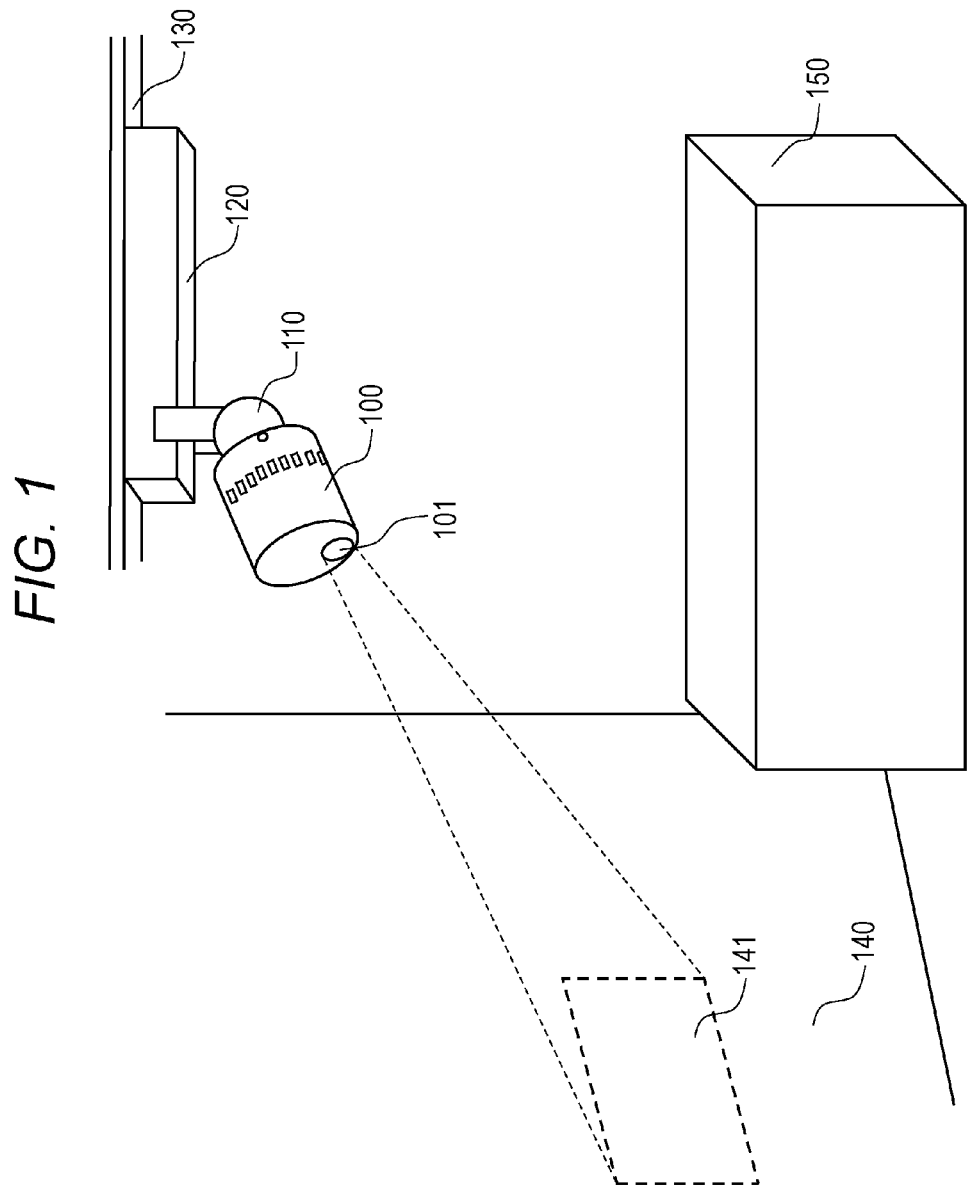
FIG. 1 is a diagram describing a state where a projector device is projecting a picture on a wall.
Figure 2:
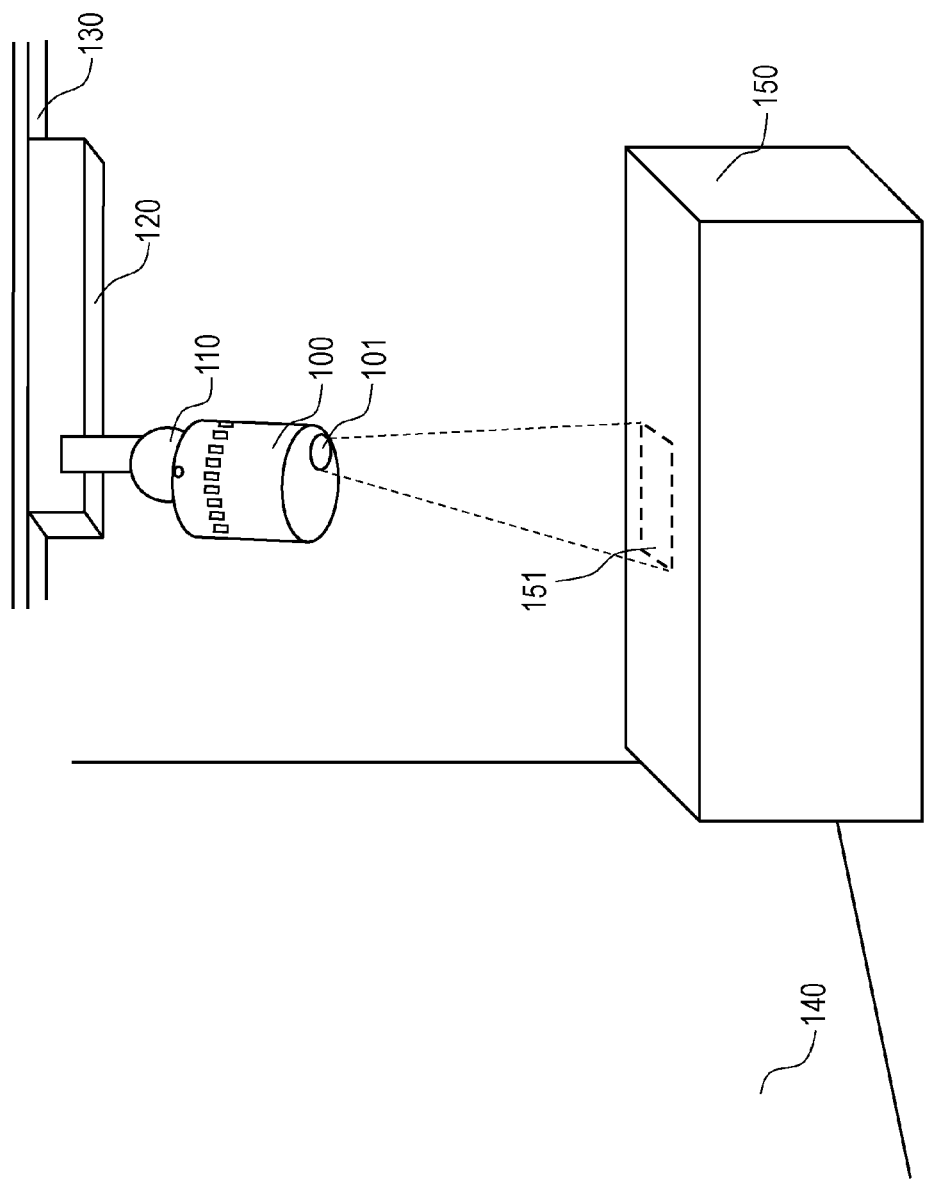
FIG. 2 is a diagram describing a state where the projector device is projecting a picture on a table.

An outline of a picture projection behavior of projector device 100 will be described with reference to FIGS. 1 and 2. FIG. 1 is a diagram describing a state where projector device 100 is projecting a picture on a wall. FIG. 2 is a diagram describing a state where projector device 100 is projecting a picture on a table.

As shown in FIGS. 1 and 2, projector device 100 is fixed to casing 120 via drive unit 110. Wires that are electrically connected to respective units of projector device 100 and drive unit 110 are connected with a power source via casing 120 and wire duct 130. Power is thus supplied to projector device 100 and drive unit 110. Projector device 100 includes an opening 101. Projector device 100 projects a picture on a projection surface via opening 101.

Drive unit 110 is capable of driving projector device 100 in such a way as to change a projection direction of a picture. That is, drive unit 110 includes a mechanism for changing the direction of projection device 100, and a motor and an actuator for driving the mechanism. Drive unit 110 may drive projector device 100 such that the projection direction of a picture is in the direction of wall 140, as shown in FIG. 1.

Projector device 100 may thereby project picture 141 on wall 140. Drive unit 110 may, in a similar manner, drive projection device 100 such that the projection direction of a picture is in the direction of table 150, as shown in FIG. 2. Projector device 100 may thereby also project picture 151 on table 150. Drive unit 110 may perform driving based on a manual operation of a user, or may automatically perform driving according to a detection result of a predetermined sensor. Also, the contents of picture 141 to be projected on wall 140 and picture 151 to be projected on table 150 may be different or the same.

User interface device 200 is mounted on projector device 100. User interface device 200 allows a user to operate the projection surface (wall 140, table 150) itself of a picture (141, 151) as operation means such as a touch panel.

Figure 3:
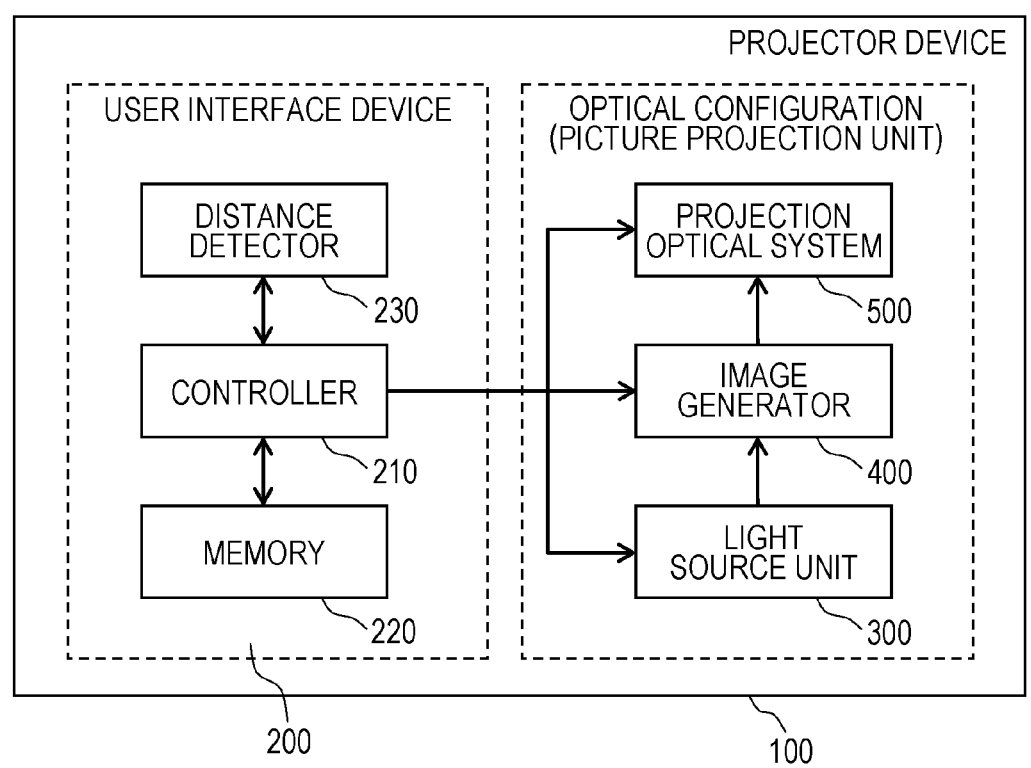
FIG. 3 is a block diagram showing an electrical configuration of the projector device.

Hereinafter, a configuration and a behavior of projector device 100 will be described in detail.
1. Configuration of Projector Device
FIG. 3 is a block diagram showing an electrical configuration of projector device 100. Projector device 100 includes user interface device 200, light source unit 300, image generator 400, and projection optical system 500. In the following, a configuration of each unit configuring projection device 100 will be sequentially described.
1.1 User Interface Device User interface device 200 includes controller 210, memory 220, and distance detector 230. User interface device 200 is means for detecting an operation when the operation is performed, by a user using his/her finger 160 as pointing means, on an operation target which is presented on a predetermined object, and for causing a behavior according to the operation to be performed.

Controller 210 is a semiconductor device for controlling entire projector device 100. That is, controller 210 controls the behavior of each unit (distance detector 230, memory 220) configuring user interface device 200, and of light source unit 300, image generator 400, and projection optical system 500. Controller 210 may be configured by hardware only, or may be realized by combining hardware and software. For example, controller 210 may be configured by a CPU, an MPU, an ASIC, an FPGA, or a DSP.

Memory 220 is a storage device storing various pieces of information. Memory 220 is configured by a flash memory, a ferroelectric memory or the like. Memory 220 stores control programs for controlling projector device 100 (including user interface device 200), for example. Also, memory 220 stores various pieces of information supplied by controller 210.

Distance detector 230 is configured by a TOF (Time-of-Flight) sensor, for example, and linearly detects the distance to a facing surface. When distance detector 230 faces wall 140, the distance from distance detector 230 to wall 140 is detected. Likewise, when distance detector 230 faces table 150, the distance from distance detector 230 to table 150 is detected.

Figure 4A:
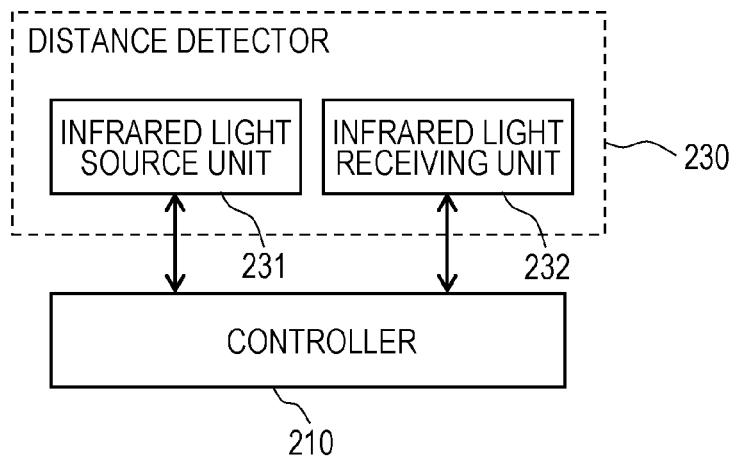
FIG. 4A is a block diagram showing an electrical configuration of a distance detector.

FIG. 4A is a block diagram showing an electrical configuration of distance detector 230. As shown in FIG. 4A, distance detector 230 is configured from infrared light source unit 231 for radiating infrared detection light, and infrared light receiving unit 232 for receiving infrared detection light reflected by a facing surface. Infrared light source unit 231 radiates infrared detection light through opening 101 in such a way that the light is diffused to the surrounding. For example, infrared light source unit 231 uses infrared light of a wavelength between 850 nm to 950 nm as the infrared detection light. Infrared light receiving unit 232 includes a plurality of pixels that are two-dimensionally arranged on an imaging surface.

Controller 210 receives, from infrared light source unit 231, information about a phase of infrared detection light radiated by infrared light source unit 231, and stores the information in memory 220. In the case where a facing surface is inclined or shaped and is not entirely at an equal distance from distance detector 230, the plurality of pixels that are two-dimensionally arranged on the imaging surface of infrared light receiving unit 232 receive reflected light at different timings. Since the pixels receive light at different timings, the phase of the infrared detection light received by infrared light receiving unit 232 is different for each pixel. Controller 210 receives, from infrared light receiving unit 232, information about the phase of the infrared detection light received at each pixel of infrared light receiving unit 232, and stores the information in memory 220.

Controller 210 reads, from memory 220, the phase of infrared detection light radiated by infrared light source unit 231, and the phase of infrared detection light received at each pixel of infrared light receiving unit 232. Controller 210 measures, based on the phase difference between the infrared detection light radiated by distance detector 230 and the infrared detection light received by distance detector 230, the distance from distance detector 230 to the facing surface (each pixel), and generates and outputs distance information (distance image) based on the measurement result.

Figure 4B:
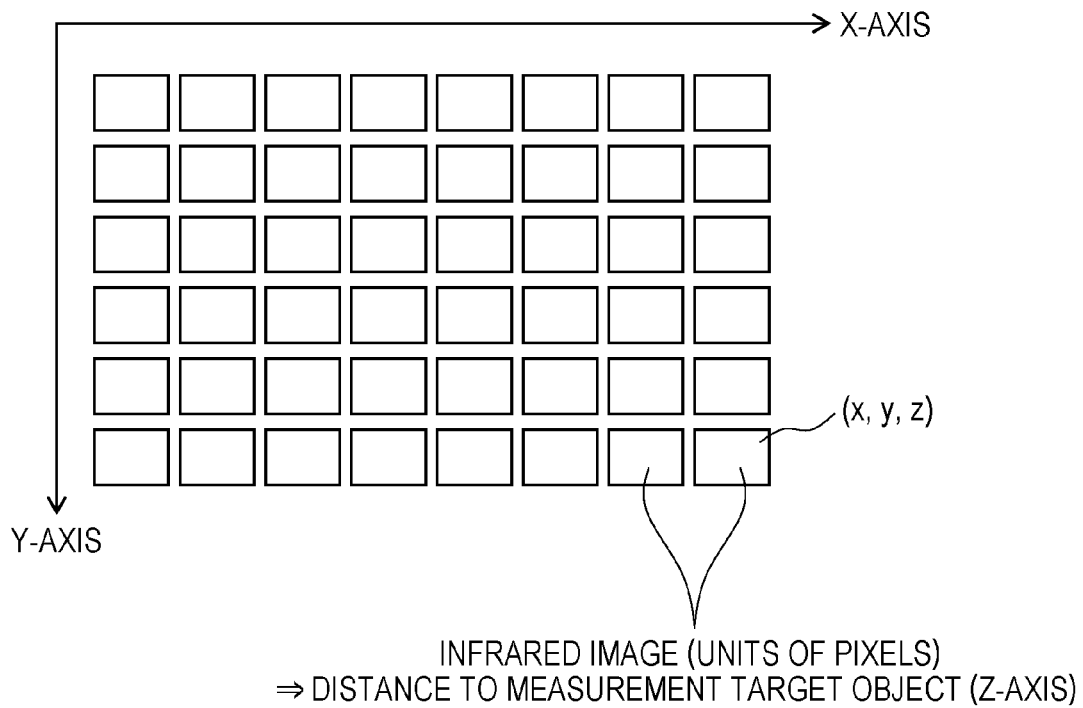
FIG. 4B is a diagram for describing distance information acquired by the distance detector.

FIG. 4B is a diagram for describing the distance information acquired by distance detector 230 (infrared light receiving unit 232). Distance detector 230 detects the distance for each pixel forming an infrared image that is based on received infrared detection light. Controller 210 may thus obtain, on a per pixel basis, a distance detection result for the entire angle of view of an infrared image received by distance detector 230. As shown in FIG. 4B, in the following description, the horizontal direction of an infrared image is taken as the X axis, and the vertical direction is taken as the Y axis. Moreover, the detected distance direction is taken as the Z axis. Controller 210 may acquire the coordinates (x, y, z) of three axes, X, Y and Z, for each pixel forming the infrared image, based on the detection result of distance detector 230. That is, controller 210 may acquire the distance information (distance image) based on the detection result of distance detector 230.

In the present exemplary embodiment, a TOF sensor is cited as an example of distance detector 230, but the present disclosure is not limited to such an example. That is, distance detector 230 may project a known pattern such as a random dot pattern and calculate the distance based on the shift in the pattern, or may use the parallax of a stereo camera.

1.2 Optical Configuration

Figure 5:
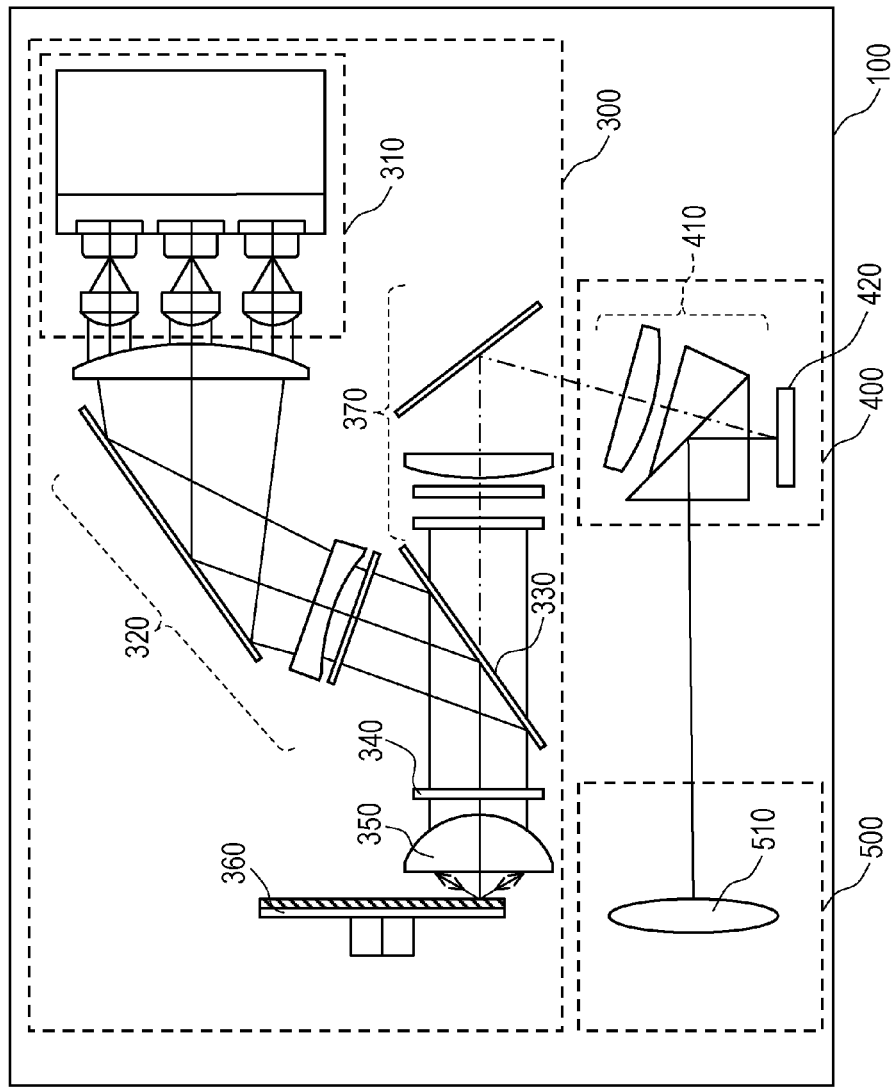
FIG. 5 is a block diagram showing an optical configuration of the projector device.

Next, an optical configuration (picture projection unit) of the projector device, that is, configurations of light source unit 300, image generator 400 and projection optical system 500, will be described with reference to FIG. 5. FIG. 5 is a block diagram showing an optical configuration of projector device 100. As shown in FIG. 5, light source unit 300 supplies light that is necessary for generation of a projection image to image generator 400. Image generator 400 supplies a generated picture to projection optical system 500. Projection optical system 500 performs optical transformation such as focusing or zooming on the picture supplied by image generator 400. Projection optical system 500 faces opening 101, and the picture is projected from opening 101.

First, the configuration of light source unit 300 will be described. As shown in FIG. 5, light source unit 300 includes semiconductor laser 310, dichroic mirror 330, λ/4 plate 340, phosphor wheel 360 and the like. Semiconductor laser 310 is a solid light source that emits S-polarized blue light having a wavelength of 440 nm to 455 nm, for example. S-polarized blue light that is emitted from semiconductor laser 310 enters dichroic mirror 330 via light guiding optical system 320.

For example, dichroic mirror 330 is an optical device having a high reflectance of 98% or more for the S-polarized blue light having a wavelength of 440 nm to 455 nm, but having a high transmittance of 95% or more for P-polarized blue light having a wavelength of 440 nm to 455 nm and green to red light having a wavelength of 490 nm to 700 nm regardless of the polarization state. Dichroic mirror 330 reflects the S-polarized blue light emitted by semiconductor laser 310 in the direction of λ/4 plate 340.

λ/4 plate 340 is a polarizer for converting linear polarization into circular polarization, or for converting circular polarization into linear polarization. λ/4 plate 340 is disposed between dichroic mirror 330 and phosphor wheel 360. S-polarized blue light which has entered λ/4 plate 340 is converted into blue light of circular polarization, and is radiated on phosphor wheel 360 through lens 350.

Phosphor wheel 360 is a flat aluminum plate that is capable of rotating at a high speed. A plurality of B regions which are regions of diffusely reflecting surfaces, G regions where phosphor that emits green light is applied, and R regions where phosphor that emits red light is applied are formed on the surface of phosphor wheel 360. Circular-polarized blue light radiated on the B region of phosphor wheel 360 is diffusely reflected, and enters λ/4 plate 340 again as circular-polarized blue light. Circular-polarized blue light which has entered λ/4 plate 340 is converted into P-polarized blue light, and enters dichroic mirror 330 again. The blue light entering dichroic mirror 330 at this time is P-polarized, and thus the light passes through dichroic mirror 330, and enters image generator 400 via light guiding optical system 370.

Blue light that is radiated on the G region of phosphor wheel 360 excites the phosphor applied on the G region, and causes green light to be emitted. The green light emitted from the G region enters dichroic mirror 330. The green light entering dichroic mirror 330 at this time passes through dichroic mirror 330, and enters image generator 400 via light guiding optical system 370. In the same manner, blue light that is radiated on the R region of phosphor wheel 360 excites the phosphor applied on the R region, and causes red light to be emitted. The red light emitted from the R region enters dichroic mirror 330. The red light entering dichroic mirror 330 at this time passes through dichroic mirror 330, and enters image generator 400 via light guiding optical system 370.

Since phosphor wheel 360 is rotating at a high speed, blue light, green light, and red light are emitted from light source unit 300 to image generator 400 in a time-division manner.

Image generator 400 generates a projection image according to a picture signal that is supplied by controller 210. Image generator 400 includes DMD (Digital-Mirror-Device) 420 and the like. DMD 420 is a display device having a large number of micromirrors arranged on the flat surface. DMD 420 deflects each of the arranged micromirrors according to the picture signal supplied by controller 210, and spatially modulates the entering light. Light source unit 300 emits blue light, green light, and red light in a time-division manner. DMD 420 repeatedly receives, via light guiding optical system 410, blue light, green light, and red light that are emitted in a time-division manner. DMD 420 deflects each micromirror in synchronization with the timing of emission of light of each color. Image generator 400 thereby generates a projection image according to the picture signal. DMD 420 deflects the micromirrors according to the picture signal to light that proceeds to the projection optical system and light that proceeds to outside the effective coverage of the projection optical system. Image generator 400 may thereby supply the generated projection image to projection optical system 500.

Projection optical system 500 includes optical members 510 such as zoom lens and focus lens. Projection optical system 500 magnifies the light entering from image generator 400, and projects the same on a projection surface.

A configuration according to a DLP (Digital-Light-Processing) method using DMD 420 is described above as an example of projector device 100, but the present disclosure is not limited thereto. That is, projector device 100 may alternatively adopt a configuration according to a liquid crystal method.

Also, a configuration according to a single panel method where a light source using phosphor wheel 360 is used in a time-division manner is described above as an example of projector device 100, but the present disclosure is not limited thereto. That is, projector device 100 may adopt a three panel method where various light sources for blue, green and red colors are provided.

A configuration is described above according to which a light source for blue light for generating a projection picture and a light source for infrared light for measuring a distance are separate units, but the present disclosure is not limited thereto. That is, a light source for blue light for generating a projection picture and a light source for infrared light for measuring a distance may be an integrated unit. In the case of adopting the three panel method, the light sources of respective colors and a light source for infrared light may be an integrated unit.

2. Behavior of User Interface Device

A behavior of user interface device 200 mounted on projector device 100 will be described.

Projector device 100 according to the present exemplary embodiment projects a picture of an operation member, such as an icon, a button or a keyboard, on a projection surface (for example, wall 140 or table 150) where a picture is to be projected. User interface device 200 detects an operation, on an operation member projected on projection surface 180, performed by a user using his/her finger 160 as pointing means, for example. Then, user interface device 200 causes a behavior according to the detected operation to be performed.

First, a problem that is assumed with respect to user interface device 200 that performs above-described behavior will be described. FIGS. 6A and 6B are diagrams for describing a problem that may occur in a case where distance detector 230 and projection surface 180, which is a target of a touch operation, do not squarely face each other. FIGS. 6A and 6B show a state where projector device 100 is inclined and does not squarely face facing projection surface 180 (for example, wall 140 or table 150). In such a case, there is a problem that the distance between the projection surface and an object (for example, a finger of a user) performing an operation on the projection surface is erroneously measured, and that a user operation is not appropriately detected.

FIGS. 6A and 6B each show a case where finger 160 of a user is positioned at position PA1 and a case where finger 160 is positioned at position PA2. Here, normal distance D'1 from projection surface 180 to position PA1 and normal distance D'2 from projection surface 180 to position PA2 are the same. Also, it is assumed that a user who is placing finger 160 at position PA1 intends a touch operation on position PB1 which is immediately below and which is on projection surface 180. In the same manner, it is assumed that a user who is placing finger 160 at position PA2 intends a touch operation on position PB2 which is immediately below and which is on projection surface 180.

As described above, distance detector 230 linearly detects the distance to facing projection surface 180. Accordingly, distance detector 230 detects, as the distance to finger 160 positioned at position PA1, distance D1 from the distance detector to position PAL In the same manner, distance detector 230 detects distance D4 as the distance to finger 160 positioned at position PA2.

A method is conceivable according to which determination of a touch operation on projection surface 180 by finger 160 of a user is realized by using a detection result of distance detector 230 (distance from distance detector 230 to projection surface 180) as it is, and by comparing the distance with a predetermined threshold. A touch operation may be appropriately determined by this method if distance detector 230 and projection surface 180 squarely face each other (if a light receiving surface of infrared light receiving unit 232 of distance detector 230 and projection surface 180 are parallel with each other).

However, as shown in FIGS. 6A and B, in the case where distance detector 230 of projector device 100 and projection surface 180 do not squarely face each other but obliquely face each other, even if the normal distance from finger 160 to projection surface 180 is the same, the detection result of distance detector 230 (distance from distance detector 230 to projection surface 180) greatly varies depending on the position of finger 160 performing a touch operation. For example, as shown in FIG. 6A, the normal distances (D'1, D'2) to projection surface 180 are actually the same for a case where finger 160 is positioned at position PA1 and a case where finger 160 is positioned at position PA2, but determined distances D3 and D6 to be used for touch operations are greatly different.

Regarding specific determined distances, in the case where finger 160 is at position PA1, the distance from distance detector 230 to finger 160 is D1, and the distance from distance detector 230 to the projection surface is D2 (distance to the projection surface is acquired in advance by distance detector 230). Accordingly, the distance from finger 160 to projection surface 180 is D3=(D2−D1). On the other hand, in the case where finger 160 is at position PA2, the distance from distance detector 230 to finger 160 is D4, and the distance from distance detector 230 to projection surface 180 is D5. Accordingly, the distance from finger 160 to projection surface 180 is D6=(D5−D4), and the determined distance is greatly different for a case where finger 160 is positioned at position PA1 and where finger 160 is positioned at position PA2.

The inventor(s) of the present invention has/have test-manufactured and studied user interface device 200 which causes, in a case where distance detector 230 and projection surface 180 do not squarely face each other but obliquely face each other, projection surface 180 to function as a surface which is to be taken as a target of a touch operation. As a result, the inventor(s) of the present invention has/have come to recognize the present problem in the course of test-manufacturing and studying user interface device 200 and to devise means for solution described below.

Specifically, the inventor(s) of the present invention has/have devised a method, as shown in FIG. 6B, for detecting a normal vector (normal distance) from finger 160 to projection surface 180 regardless of the position of finger 160, and for determining a touch operation based on the detected normal vector. User interface device 200 which may appropriately determine a touch operation even in a case where distance detector 230 and projection surface 180 do not squarely face each other but obliquely face each other is thus realized.

In the following, a configuration for detecting a normal vector (normal distance) from finger 160 to projection surface 180 regardless of the position of finger 160, and for determining a touch operation based on the detected normal vector will be described in detail.

Figure 7:
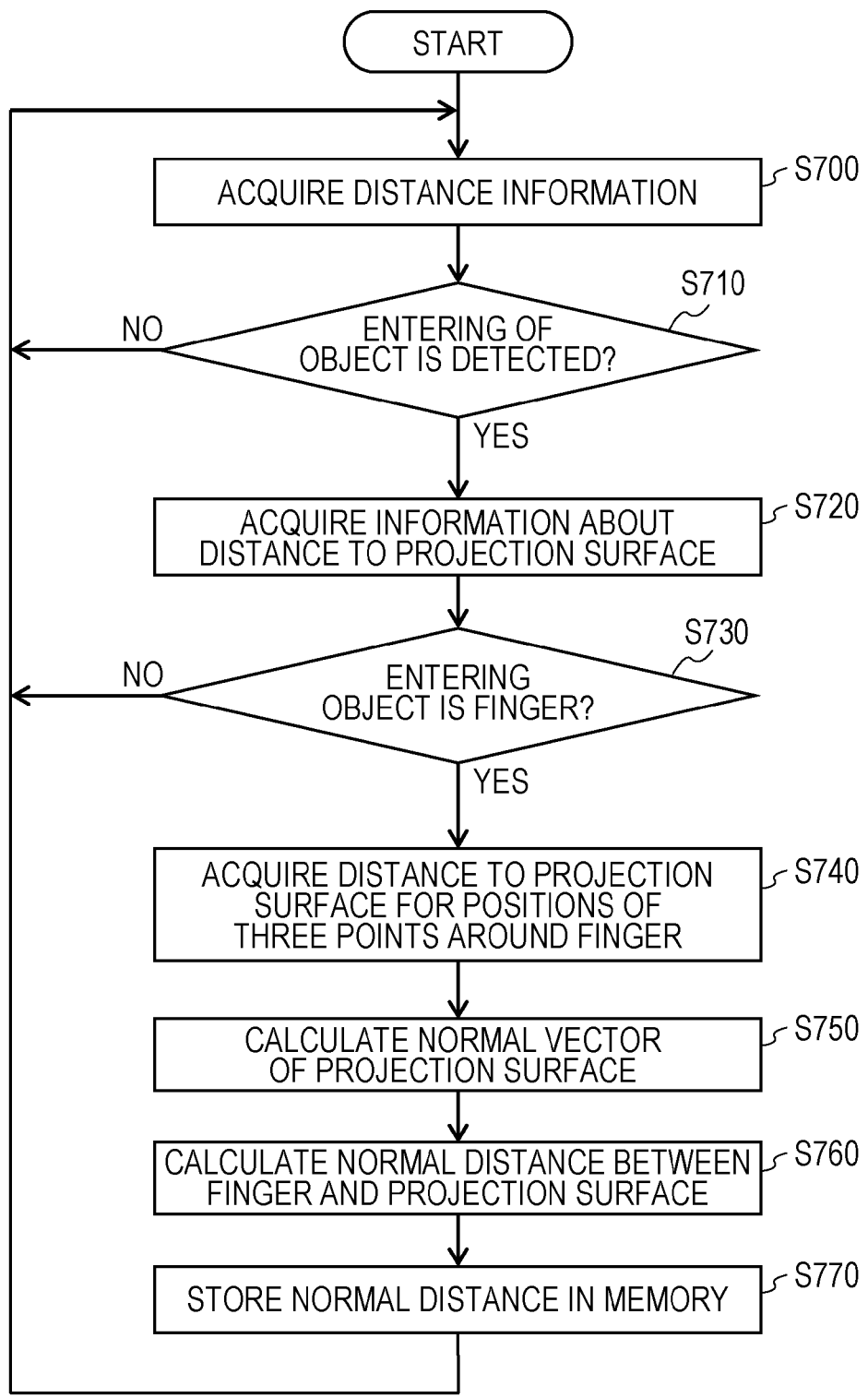
FIG. 7 is a flow chart showing a process for calculating a normal vector and a distance in a normal direction from a finger to a projection surface.
Figure 8:
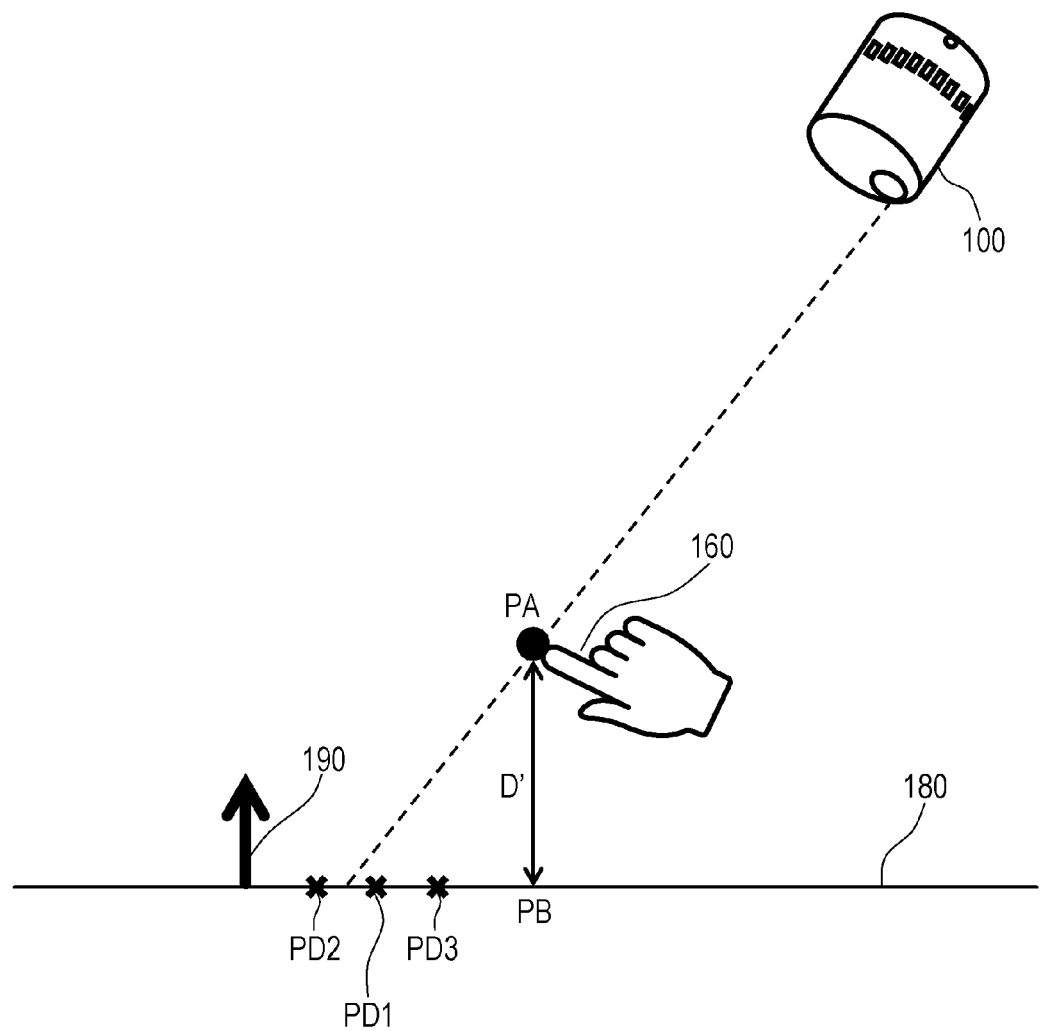
FIG. 8 is a diagram for describing calculation of a distance in the normal direction between a finger and a projection surface.
Figure 9:
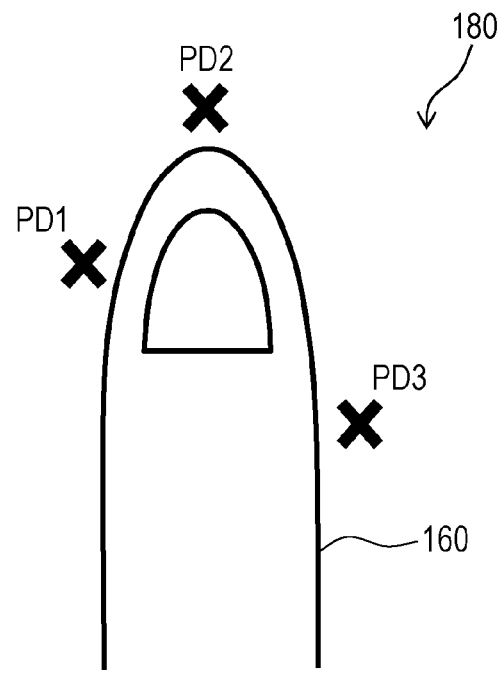
FIG. 9 is a diagram for describing three points located around a finger.

FIG. 7 is a flow chart showing a process for calculating a normal vector from finger 160 to projection surface 180. FIG. 8 is a diagram for describing calculation of the distance in the normal direction between finger 160 and projection surface 180. FIG. 9 is a diagram for describing three points located around finger 160. Additionally, in the present exemplary embodiment, a picture showing a user interface (icon, button, keyboard, etc.) to be used by a user for an operation is projected by user interface device 200 on projection surface 180.

First, controller 210 acquires distance information from distance detector 230 (S700). Next, controller 210 detects, based on the acquired distance information, whether an object (a finger of a user, for example) has entered between distance detector 230 and projection surface 180 where a picture as a target of a touch operation is projected (S710). Any known technology may be used for decision regarding entering of an object. For example, whether an object has entered or not may be decided by using temperature detection by infrared radiation, such as by a presence sensor. Alternatively, whether an object has entered or not may be decided by a motion detection process of calculating a time difference (inter-frame difference) of images obtained by capturing the projection surface as a target of a touch operation, and of determining whether the difference has exceeded a specific threshold or not.

Controller 210 repeats step S700 of acquiring distance information from distance detector 230 (S700, NO in S710) until entering of an object between projection surface 180 and distance detector 230 is detected. On the other hand, in the case where entering of an object between projection surface 180 and distance detector 230 is detected (YES in S710), controller 210 acquires, from memory 220, distance information for projection surface 180 before current detection of entering of an object (S720). Additionally, pieces of distance information for several past frames including an immediately preceding frame are stored in memory 220 as information about the distance to projection surface 180. For example, the distance to projection surface 180 is measured by distance detector 230 in an initialization process at the time of turning on of projector device 100, in a state where there is no object between projection surface 180 and distance detector 230, and distance information is stored in memory 220 based on the measurement result.

Next, controller 210 detects whether the object detected in step S710 is finger 160 or not (S730). Whether it is a finger or not may be detected by performing a matching process based on information indicating the features of the shape of a finger stored in advance, for example. Alternatively, the matching process may be performed based on distance information for a finger stored in advance. Moreover, any known technology may be used in the method for detecting whether an object is a finger or not.

In the case where the object which has entered is detected to be other than a finger (NO in S730), controller 210 returns to the process in step S700, and acquires distance information.

In the case where the object which has entered is detected to be a finger (YES in S730), controller 210 acquires distance information (XYZ coordinates) of at least three points, on projection surface 180, present around the position (XY-coordinate position) of the detected finger (S740). Specifically, as shown in FIG. 8, controller 210 obtains position (XYZ coordinates) PA of the finger from the distance information for projection surface 180 which has been stored in memory 220 in step S720. Next, as shown in FIG. 9, controller 210 acquires distance information for between distance detector 230 and projection surface 180 for positions PD1 to PD3 of the at least three points near position PA obtained.

Subsequently, controller 210 calculates normal vector 190 of projection surface 180 from the pieces of distance information (XYZ coordinates) of the three points acquired in step S740 (S750). Specifically, controller 210 calculates orthogonal vectors of two vectors represented by the three points, by calculating the cross product of the two vectors represented by three points based on the pieces of distance information (XYZ coordinates) of the three points. A unit vector of the calculated orthogonal vectors is normal vector 190 of projection surface 180.

Then, controller 210 calculates, from normal vector 190 calculated in step S750 and the position of the finger calculated in step S740, the distance (normal distance) from the coordinates of the finger to a point of intersection of a line segment, extending in the normal direction of the projection surface, and the projection surface (S760). Specifically, the normal distance is obtained by calculating an absolute value of an inner product of a vector connecting the position (XYZ coordinates) of the finger calculated in step S740 and the position (XYZ coordinates), on the projection surface, corresponding to the XY-coordinate position of the finger, and normal vector 190 of the projection surface calculated in step S750. For example, in FIG. 8, normal distance D' is obtained by calculating an absolute value of an inner product of a vector connecting position PA of the finger and position PB, on projection surface 180, corresponding to position PA of the finger, and normal vector 190 of projection surface 180.

Then, controller 210 stores the normal distance calculated in step S760 in memory 220 (S770). In the case where a normal distance is already stored in memory 220, controller 210 overwrites (updates) the normal distance by the newly calculated normal distance.

Additionally, when entering of an object is no longer detected in step S710, or when an entering object is detected in step S730 to be other than a finger, controller 210 erases the normal distance that is stored in memory 220.

Then, controller 210 returns to step S700, and repeats the process described above.

The normal distance from finger 160 of the user to projection surface 180 is obtained in the above manner, and is stored in memory 220. The normal distance obtained in the above manner is used for determination of a finger of a user coming close to a picture (icon, button, etc.) for operation that is projected on the projection surface.

3. Execution of Application Based on Operation

Figure 10:
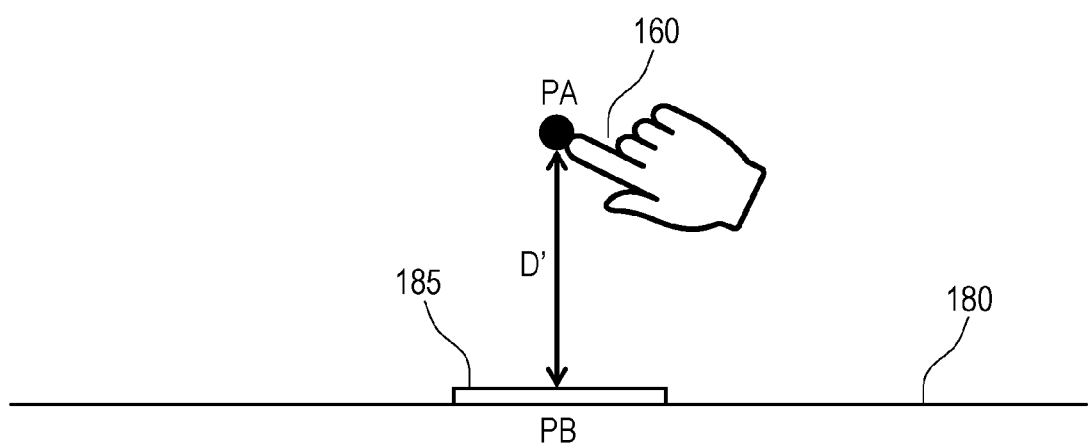
FIG. 10 is a diagram for describing determination of a touch operation.

Hereinafter, a process for deciding whether an application based on an operation on an interface image that is projected on projection surface 180 should be executed or not will be described. FIG. 10 is a diagram for describing determination of a touch operation. Here, a case is considered, as shown in FIG. 10, where interface image 185 (icon, button, keyboard, etc.) as an operation target is displayed on projection surface 180. In the case of performing a touch operation on interface image 185, a user brings his/her finger 160 close to interface image 185.

Figure 11:
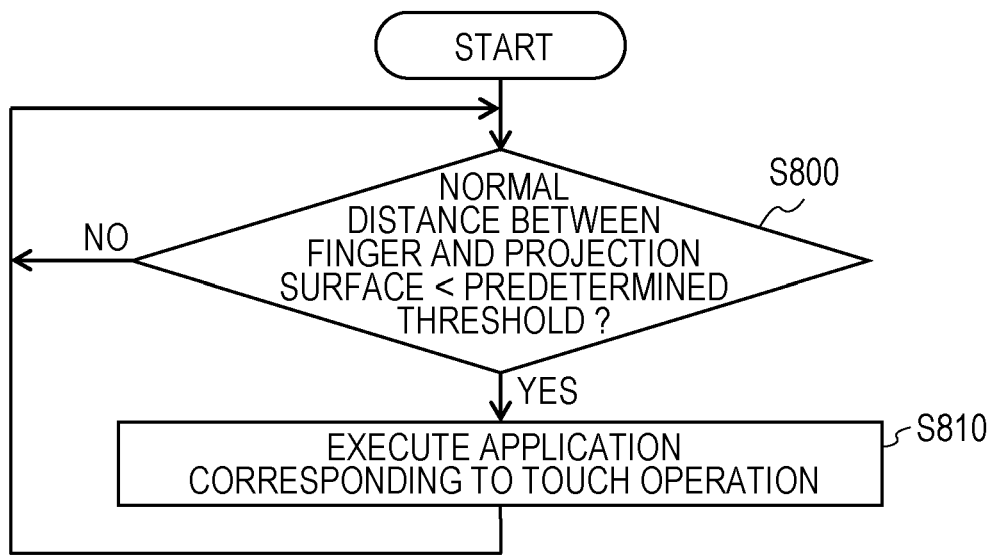
FIG. 11 is a flow chart showing a process for deciding whether an application should be executed or not.

FIG. 11 is a flow chart showing a behavior for deciding whether an application based on a user operation on the interface image should be executed or not. Controller 210 decides whether execution of an application should be carried out or not, by performing touch determination based on normal distance D' between finger 160 and projection surface 180.

Specifically, controller 210 compares normal distance D' stored in memory 220 with a predetermined threshold (S800). In the case where normal distance D' is at or above the predetermined threshold (NO in S800), controller 210 determines that a touch operation is not performed, and does not execute an application. On the other hand, in the case where normal distance D' is below the predetermined threshold (YES in S800), controller 210 determines that a touch operation has been performed, and executes a predetermined application corresponding to interface image 185 on which the touch operation has been performed (S810). Controller 210 repeats the process described above at a predetermined cycle.

3.1 Example Execution of Application

Figure 12:
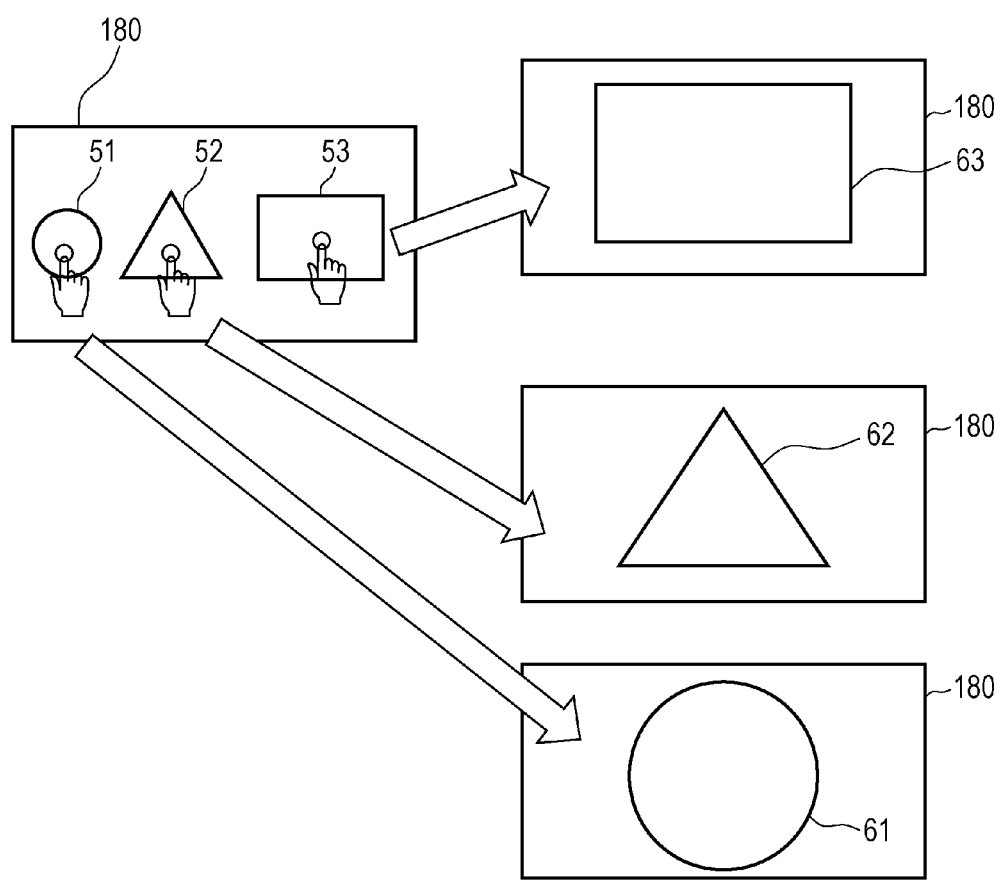
FIG. 12 is a diagram for describing example execution of a first application.
Figure 13A:
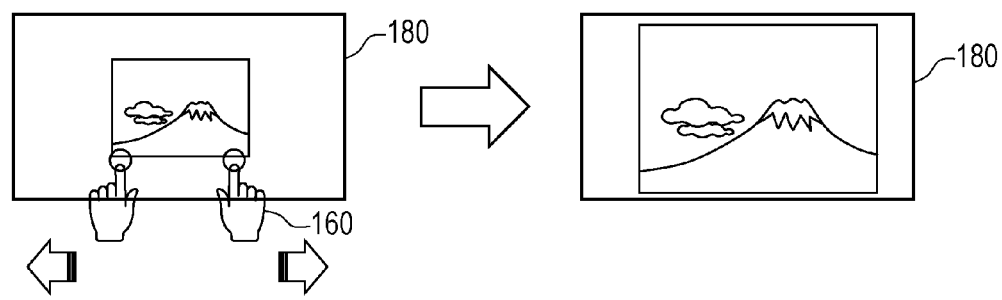
FIG. 13A is a diagram for describing example execution of a second application.
Figure 13B:
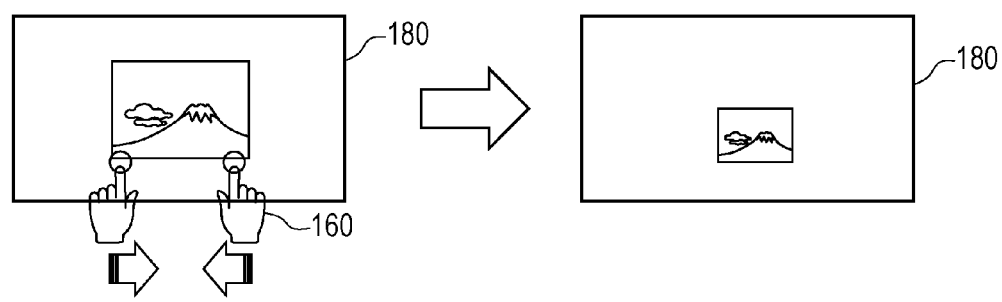
FIG. 13B is a diagram for describing example execution of the second application.
Figure 13C:
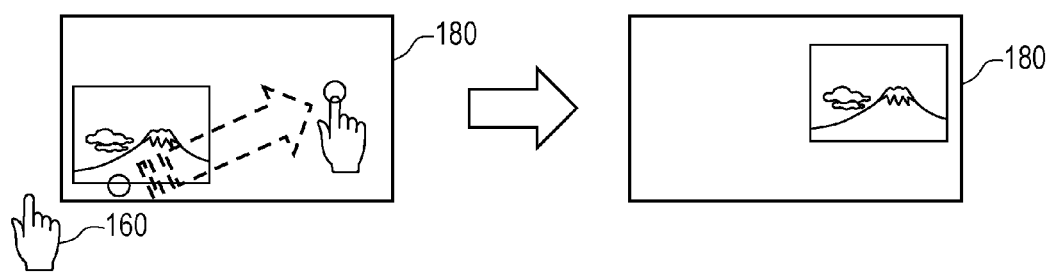
FIG. 13C is a diagram for describing example execution of the second application.

Next, example execution of an application based on determination of a touch operation by projector device 100 will be described. FIG. 12 is a diagram for describing example execution of a first application (application that is started by a touch operation). FIGS. 13A, 13B and 13C are diagrams for describing example execution of a second application (application that is started by a gesture operation).

Control regarding determination of a touch operation according to the exemplary embodiment described above may be used with respect to an application for interacting with a picture that is projected on projection surface 180 (for example, wall 140 or table 150) by projector device 100. That is, in the case where it is determined that a touch operation is performed, controller 210 may switch a picture to be projected according to the coordinate position where the touch operation is performed. For example, as shown in FIG. 12, in the case where pictures 51, 52 and 53 are projected on projection surface 180, if a touch operation is determined to have been performed on one of the pictures, controller 210 switches the picture to be projected according to picture 51, 52 or 53 which has been touched. In the example shown in FIG. 12, switching is performed between pictures 61, 62 and 63. In other words, control regarding determination of a touch operation according to the present exemplary embodiment may be applied to an application for shifting to a picture that is set in advance, according to coordinates where a touch operation is determined to have been performed. As an example of such an application, an application is conceivable which projects, on projection surface 180, a picture of a menu of a restaurant showing a plurality of names of dishes, and which displays, when a name of a dish is selected, an image or detailed information about the dish corresponding to the name of the dish.

Furthermore, a second application has a function of changing a projected picture according to a so-called gesture operation. FIGS. 13A and 13B are diagrams describing a function of changing a projected image according to a pinch-in or pinch-out operation. That is, controller 210 enlarges or reduces a picture projected by projector device 100 on projection surface 180 based on a change in the distance between coordinates of two points where touch operations are performed. In this case, touch determination has to be performed for two points, and the above-described determination control may be used in the determination of presence or absence of a touch operation on a plurality of points.

FIG. 13C is a diagram describing a function of changing a projected image according to a drag-and-drop operation. As shown in FIG. 13C, in the case where a user performs a touch operation on a projected picture and moves the position of the touch operation while maintaining a state where the touch operation is performed (while maintaining the height of the finger above projection surface 180), a picture which is the target of the touch operation may be moved according to the movement of the position of the touch operation. In the case of such an application, it is desirably determined that a touch operation is performed when the distance in the normal direction between finger 160 of a user and projection surface 180 becomes as small as possible. For example, considering the average thickness of a person's finger and a variance in the accuracy of a sensor of distance detector 230, a predetermined threshold to be compared against the normal distance may be made about 30 mm. Additionally, depending on the accuracy of the sensor of distance detector 230 to be used, the threshold may be further reduced.

4. Effects, Etc.

As described above, projector device 100 according to the present exemplary embodiment includes a picture projection unit for projecting interface image 185, which is a picture of a predetermined operation member, on projection surface 180 (example of a first object), and user interface device 200 for detecting an operation on the operation member by finger 160 (example of a second object) of a user. User interface device 200 includes distance detector 230 for detecting the distance to projection surface 180 and the distance to finger 160 of the user, and controller 210 for detecting an operation based on the distances detected by distance detector 230. When determining that finger 160 is present between projection surface 180 and distance detector 230, controller 210 calculates normal vector 190 of projection surface 180 based on distances from distance detector 230 to positions of at least three points on a surface of projection surface 180 and the distance from distance detector 230 to finger 160, and detects an operation on interface image 185 by finger 160 based on normal vector 190.

For example, controller 210 may calculate distance D', in the normal direction of projection surface 180, which is the distance between finger 160 and projection surface 180, based on calculated normal vector 190, and may detect an operation on the operation member when calculated distance D' is within a predetermined range.

According to the configuration described above, even in a case where projection surface 180 that presents an operation member, which is a target of a touch operation, and distance detector 230 do not squarely face each other, the distance between the operation member and an object (such as a finger of a user) for performing an operation on the operation member may be accurately detected, and thus an operation on the presented operation member may be appropriately detected. Accordingly, an application may be appropriately executed according to a user operation.

OTHER EXEMPLARY EMBODIMENTS

The first exemplary embodiment has been described above as an example of the technology disclosed in the present application.

However, the technology in the present disclosure is not limited to the above exemplary embodiment, and may also be applied to exemplary embodiments which have been subjected to modifications, substitutions, additions, or omissions as required. Moreover, it is also possible to combine the structural elements described in the first exemplary embodiment to realize a new exemplary embodiment. In the following, other exemplary embodiments will be described as examples.

The above-described exemplary embodiment describes an example where user interface device 200 is applied to projector device 100, but the present disclosure is not limited to such a case. That is, operation means which are to be targets of operation by a user are represented by projected pictures, but these operation means may also be provided by other methods. For example, the operation means may be presented by being displayed on a sheet of paper where menus or the like are drawn, or on another display device such as a liquid crystal display. The configuration of user interface device 200 described above may be adopted as a user interface for such operation means presented in the above manner. Moreover, the configuration of user interface device 200 described above may be adopted as an interface of a control device that performs a process when a touch operation is performed not on a projected picture but an object in the real world itself.

Figure 14:
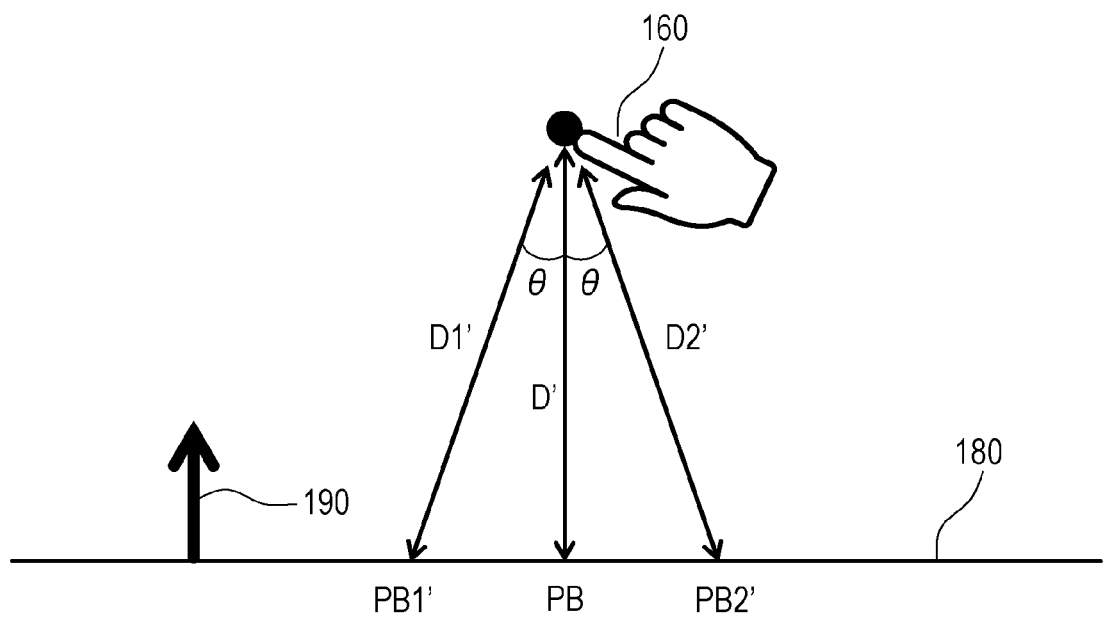
FIG. 14 is a diagram for describing detection of a user operation on a position, on a projection surface, facing a finger at an angle shifted from a normal direction of the projection surface.

An example is described above where the distance (D') in the normal direction is used in the determination of a touch operation, but the present disclosure is not limited to such an example. FIG. 14 is a diagram for describing detection of a user operation at a position, on the projection surface, facing the finger at an angle shifted from the normal direction of the projection surface. As shown in FIG. 14, distance (D1', D2') between detected position PA of a finger and position (PB1', PB2') having offset angle (θ) from the normal direction may be used in the determination of presence or absence of a touch operation instead of using distance D' itself in the normal direction in the determination of a touch operation. Also in this case, normal vector 190 has to be calculated to calculate distance (D1', D2'). Specifically, normal vector 190 from projection surface 180 to finger 160 is calculated, and normal distance D' is obtained based on calculated normal vector 190, and distance (D1', D2') to position (PB1', PB2') having offset angle (θ) may be calculated based on normal distance D' and the offset angle. A predetermined behavior may then be performed based on distance (D1', D2').

Moreover, the distance to a position of one point, on projection surface 180, having the same XY coordinates as the detected position of finger 160 may be used in the determination of a touch operation instead of using the distance itself in the normal direction in the determination of a touch operation. In this case, memory 220 of user interface device 200 stores a distance correction table according to inclination (θ) of projection surface 180 with respect to distance detector 230. The distance correction table stores, in association with each other, an inclination (α) of projection surface 180 with respect to distance detector 230 and a correction value for a threshold. Then, a correction value for a threshold may be read from the distance correction table based on the position of detected finger 160 and the inclination of projection surface 180, and a predetermined threshold used in the determination of a touch operation may be corrected based on the correction value for the threshold.

Specifically, controller 210 calculates the distance between finger 160 and projection surface 180 based on the calculated position (XYZ coordinates) of finger 160 and the position (XYZ coordinates), on projection surface 180, corresponding to the XY-coordinate position of the finger. Also, controller 210 acquires pieces of distance information (XYZ coordinates) for at least three points, on projection surface 180, around the XY-coordinate position of the finger. That is, controller 210 acquires pieces of distance information for at least three points between distance detector 230 and projection surface 180. Then, controller 210 calculates normal vector 190 of projection surface 180 based on the XYZ coordinates indicated by the acquired pieces of distance information for the three points. Controller 210 calculates the inclination between distance detector 230 and projection surface 180 from calculated normal vector 190. Controller 210 refers to an appropriate correction value in the distance correction table stored in memory 220, based on the calculated inclination and the XYZ coordinates of finger 160 detected by distance detector 230. Then, controller 210 corrects the predetermined threshold based on the correction value which has been referred to, and uses the threshold in the determination of a touch operation. Appropriate determination of a touch operation may thus be performed by referring to the distance correction table. Additionally, also in the exemplary embodiment where the distance correction table is referred to, user interface device 200 calculates normal vector 190 of the projection surface as in the exemplary embodiment described above.

Moreover, the exemplary embodiment described above cites wall 140 and table 150 as examples of a facing surface (projection surface 180), but these are not restrictive. Projector device 100 or user interface device 200 according to the present exemplary embodiment may adopt an object of any shape as the facing surface (projection surface). User interface device 200 may appropriately determine that a touch operation is performed even with an object of an arbitrary shape.

The exemplary embodiments have been described above as examples of the technology in the present disclosure. The appended drawings and the detailed description have been provided for this purpose.

Therefore, the structural elements shown in the appended drawings and described in the detailed description include not only structural elements that are essential for solving the problem but also other structural elements in order to illustrate the technology. Hence, that these non-essential structural elements are shown in the appended drawings and described in the detailed description does not cause these structural elements to be immediately recognized as being essential.

Furthermore, since the exemplary embodiments described above are for illustrating the technology in the present disclosure, various modifications, substitutions, additions, and omissions may be performed within a range of claims and equivalents to the claims.

The present disclosure may provide a user interface device that is capable of appropriately detecting a user operation. The user interface device of the present disclosure may be applied not only to the projector device as described above, but also to various devices for detecting an operation on an operation member according to a detection result of a distance detector.

What is claimed is:

1. A user interface device for detecting an operation, by a second object, on an operation member presented on a first object, the user interface device comprising:
   a distance detector for detecting a distance to the first object, and a distance to the second object; and
   a controller for detecting the operation based on the distances detected by the distance detector,
   wherein, when presence of the second object between the first object and the distance detector is determined, the controller calculates a normal vector of the first object based on distances from the distance detector to positions of at least three points on a surface of the first object and a distance from the distance detector to the second object, and detects, based on the normal vector, presence or absence of an operation done by the second object on the operation member.

2. The user interface device according to claim 1, wherein the controller calculates, based on the calculated normal vector, a distance, in a normal direction of the first object, between the second object and the first object, and when the calculated distance is within a predetermined range, the controller detects that an operation is done by the second object on the first object.

3. The user interface device according to claim 1, wherein, when an operation done by the second object on the operation member is detected, the controller causes a predetermined behavior according to the operation to be performed.

4. The user interface device according to claim 1, wherein the operation member is provided as a picture that is projected on the first object.

5. The user interface device according to claim 1, wherein the operation member is provided by being directly drawn on the first object, or by placing a member, on which the operation member is drawn, on the first object.

6. A projector device comprising;
  a picture projection unit for projecting a picture of a predetermined operation member on a first object; and
  a user interface device for detecting an operation done by a second object on the operation member,
  wherein the user interface device includes;
    a distance detector for detecting a distance to the first object, and a distance to the second object, and
    a controller for detecting the operation based on the distances detected by the distance detector,
    wherein, when presence of the second object between the first object and the distance detector is determined, the controller calculates a normal vector of the first object based on distances from the distance detector to positions of at least three points on a surface of the first object and a distance from the distance detector to the second object, and detects, based on the normal vector, presence or absence of an operation done by the second object on the operation member.

* * * * *